US012051863B1

(12) United States Patent
Hilderley

(10) Patent No.: US 12,051,863 B1
(45) Date of Patent: Jul. 30, 2024

(54) ANTI-SNAG JUMPER CABLE HANDLE COVER

(71) Applicant: Steve Hilderley, Sault Ste. Marie (CA)

(72) Inventor: Steve Hilderley, Sault Ste. Marie (CA)

( * ) Notice: Subject to any disclaimer, the term of this patent is extended or adjusted under 35 U.S.C. 154(b) by 415 days.

(21) Appl. No.: 17/474,211

(22) Filed: Sep. 14, 2021

(51) Int. Cl.
*H01R 11/24* (2006.01)

(52) U.S. Cl.
CPC .......... *H01R 11/24* (2013.01); *H01R 2201/26* (2013.01)

(58) Field of Classification Search
None
See application file for complete search history.

(56) References Cited

U.S. PATENT DOCUMENTS

| | | | | | |
|---|---|---|---|---|---|
| 3,259,754 | A * | 7/1966 | Matheson | G01R 19/14 | 320/DIG. 15 |
| 3,404,340 | A * | 10/1968 | Labrie | G01R 1/06788 | 81/421 |
| 3,853,285 | A | 12/1974 | Woodring | | |
| 3,936,121 | A * | 2/1976 | Leinberger | H01R 11/24 | 320/DIG. 15 |
| 4,037,720 | A * | 7/1977 | McGurk | H01B 7/06 | 439/504 |
| 4,136,381 | A * | 1/1979 | Bone | B60Q 1/52 | 362/311.06 |
| 4,163,134 | A * | 7/1979 | Budrose | H01R 11/24 | 200/51.09 |
| 4,261,634 | A * | 4/1981 | Robinson | H01R 31/06 | 439/627 |
| 4,345,807 | A * | 8/1982 | Shekel | H01R 11/24 | 439/759 |
| 4,653,833 | A | 3/1987 | Czubemat | | |
| 4,815,991 | A * | 3/1989 | Bakke | H01R 11/24 | 439/825 |
| 4,901,956 | A * | 2/1990 | Jacobsen | H02G 15/013 | 248/68.1 |
| 5,142,776 | A * | 9/1992 | Neely | H01R 43/005 | 81/487 |
| 5,166,478 | A * | 11/1992 | Sprouse | H02G 15/04 | 439/135 |
| 5,435,759 | A | 7/1995 | Adams | | |
| 5,573,426 | A * | 11/1996 | Grant | H01R 11/24 | 439/822 |
| D408,785 | S | 4/1999 | Davis | | |
| 6,566,606 | B1 * | 5/2003 | Hazy | H01B 11/1091 | 174/113 R |
| 8,083,555 | B2 | 12/2011 | Schouten | | |
| 8,348,204 | B2 * | 1/2013 | Kataoka | B61D 49/00 | 248/68.1 |
| 9,287,634 | B2 * | 3/2016 | Kawamura | H01R 4/206 | |
| 9,484,727 | B1 * | 11/2016 | Eichelberg | H02G 3/22 | |
| 10,309,553 | B1 * | 6/2019 | Schwalbe | H02G 3/32 | |

(Continued)

*Primary Examiner* — Krystal Robinson
(74) *Attorney, Agent, or Firm* — Kyle A. Fletcher, Esq.

(57) ABSTRACT

The tubular structure, a sealing structure, and a jumper cable structure. The tubular structure attaches to the jumper cable structure such that the jumper cable structure does not snag on the vehicle during the process of electrically connecting the jumper cable to the electric system of the vehicle. The sealing structure forms an insulating structure that encloses the tubular structure and the jumper cable structure such that the sealing structure prevents the incorporation of tubular structure and the jumper cable structure into undesirable electric current flow paths.

11 Claims, 5 Drawing Sheets

(56) References Cited

U.S. PATENT DOCUMENTS

| | | | | |
|---|---|---|---|---|
| 11,217,912 | B1 * | 1/2022 | Hemingway | H01R 4/184 |
| 2004/0050393 | A1 * | 3/2004 | Golden | A61B 17/1152 128/898 |
| 2010/0123048 | A1 * | 5/2010 | Pollard, Jr. | F16L 3/2235 248/49 |
| 2011/0094793 | A1 * | 4/2011 | Asao | B60R 16/0238 174/549 |
| 2016/0197414 | A1 * | 7/2016 | Swan | H01R 11/24 439/816 |
| 2016/0286697 | A1 * | 9/2016 | Degen | H05K 9/0098 |
| 2018/0079061 | A1 * | 3/2018 | Vertanen | B25B 7/04 |
| 2019/0140402 | A1 * | 5/2019 | Islam | H01B 7/04 |
| 2020/0266558 | A1 * | 8/2020 | Takaishi | B60R 16/0215 |
| 2023/0012683 | A1 * | 1/2023 | Cevallos | B60R 16/0215 |

* cited by examiner

ANTI-SNAG JUMPER CABLE HANDLE COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field end pieces terminating in a spring clip with gripping jaws. (H01R11/24)

SUMMARY OF INVENTION

The anti-snag jumper cable handle cover is a mechanical structure. The anti-snag jumper cable handle cover comprises a tubular structure, a sealing structure, and a jumper cable structure. The tubular structure attaches to the jumper cable structure such that the jumper cable structure does not snag on the vehicle during the process of electrically connecting the jumper cable to the electric system of the vehicle. The sealing structure forms an insulating structure that encloses the tubular structure and the jumper cable structure such that the sealing structure prevents the incorporation of tubular structure and the jumper cable structure into the formation of an undesirable electric current flow path.

These together with additional objects, features and advantages of the anti-snag jumper cable handle cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the anti-snag jumper cable handle cover in detail, it is to be understood that the anti-snag jumper cable handle cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the anti-snag jumper cable handle cover such as FIGS. 5 and 6 for bungee cord ends.

It is therefore important that the claims be regarded as including such equivalent construction insofar as they do not depart from the spirit and scope of the anti-snag jumper cable handle cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
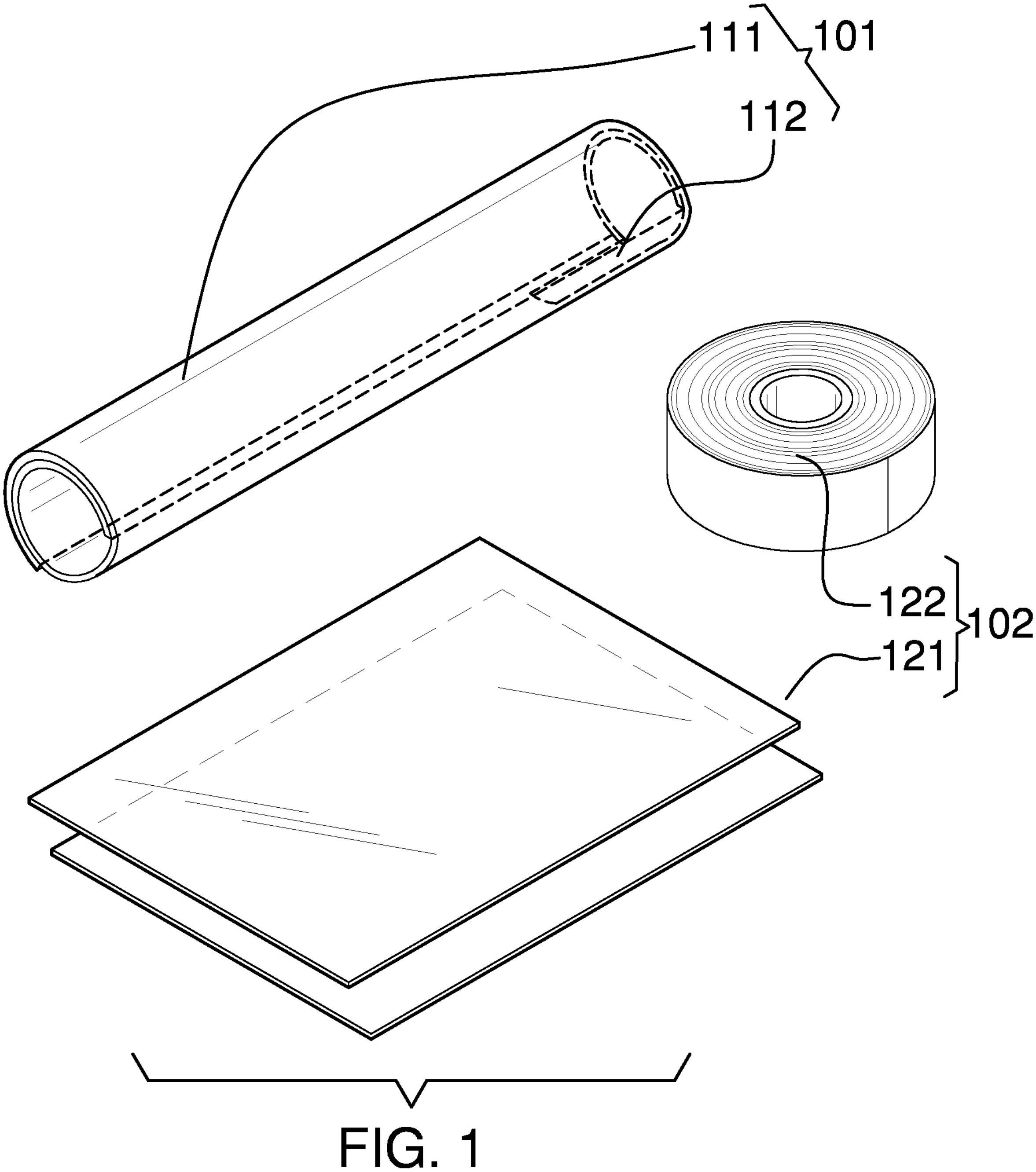
FIG. 1 is a perspective view of an embodiment of the disclosure.
Figure 2:
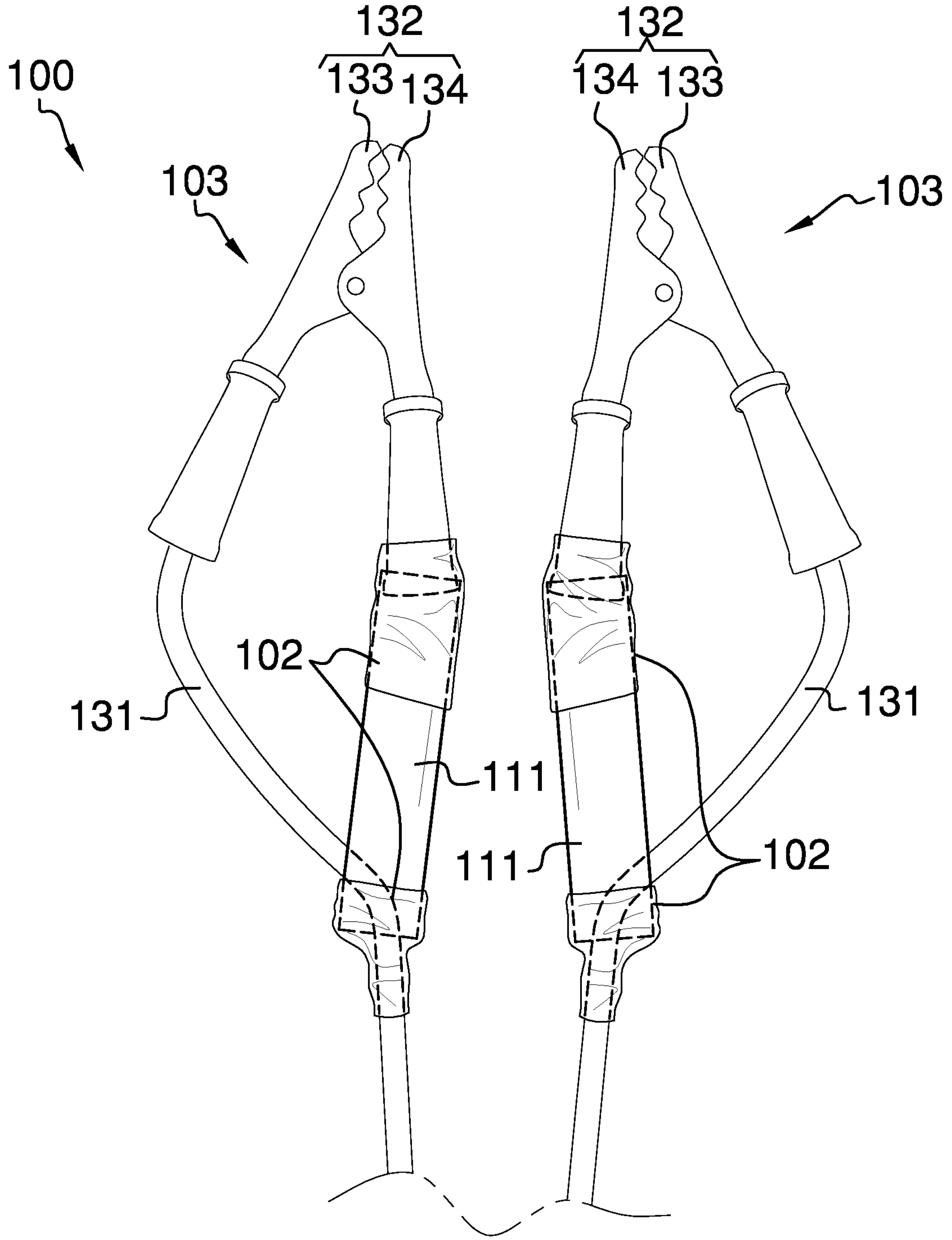
FIG. 2 is an in-use view of an embodiment of the disclosure.
Figure 3:
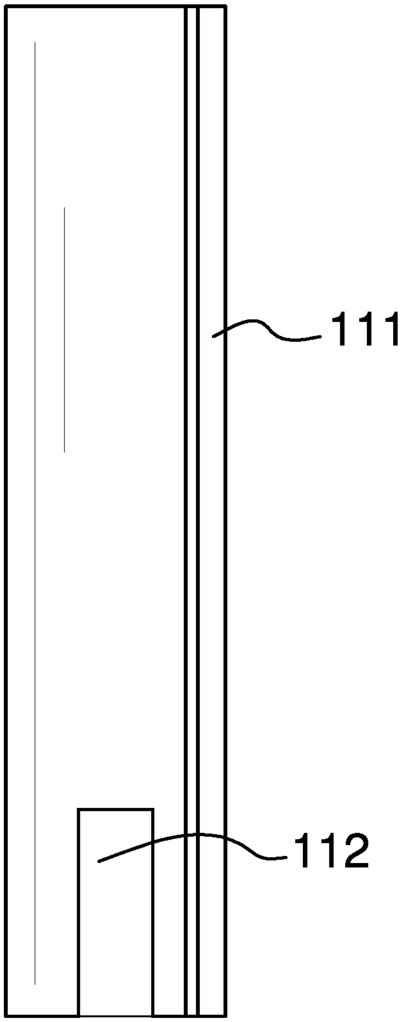
FIG. 3 is a side view of an embodiment of the disclosure.
Figure 4:
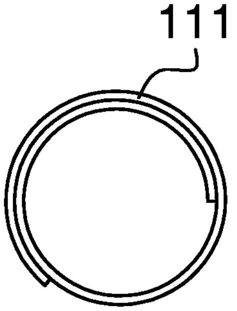
FIG. 4 is an end view of an embodiment of the disclosure.
Figure 5:
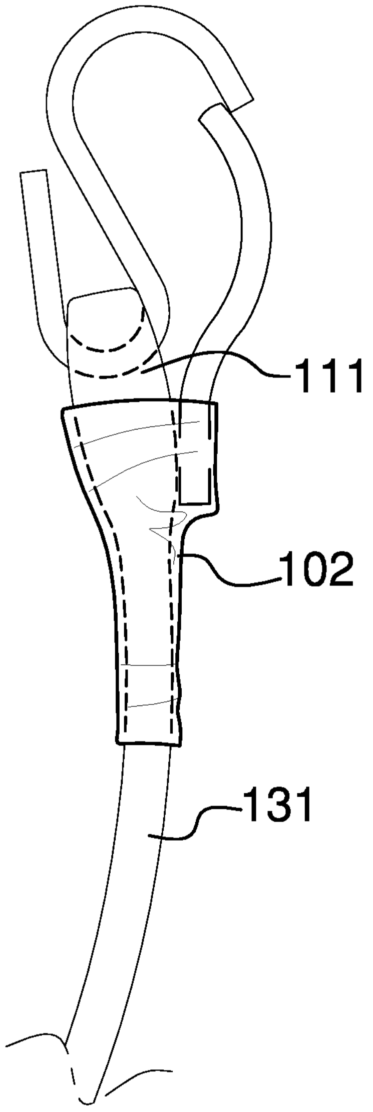
FIG. 5 is an in-use view of an alternate embodiment of the disclosure.
Figure 6:
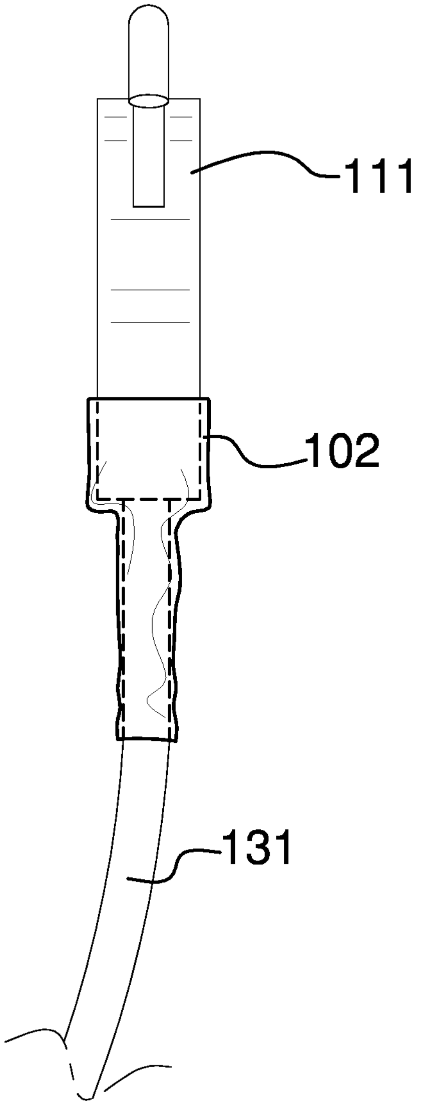
FIG. 6 is an in-use view of an embodiment of the disclosure.

Detailed reference will now be made to one or more potential embodiments of the disclosure, which are illustrated in FIGS. 1 through 6.

The anti-snag jumper cable handle cover 100 (hereinafter invention) is a mechanical structure. The invention 100 comprises a tubular structure 101, a sealing structure 102, and a jumper cable structure 103. The tubular structure 101 attaches to the jumper cable structure 103 such that the jumper cable structure 103 does not snag on the vehicle during the process of electrically connecting the jumper cable to the electric system of the vehicle. The sealing structure 102 forms an insulating structure that encloses the tubular structure 101 and the jumper cable structure 103 such that the sealing structure 102 prevents the incorporation of tubular structure 101 and the jumper cable structure 103 into undesirable electric current flow paths.

The jumper cable structure 103 is an electrically conductive structure. The jumper cable structure 103 transfers electric energy between a first electric system of a first vehicle and a second electric system of a second vehicle. The jumper cable structure 103 is defined elsewhere in this disclosure. The jumper cable structure 103 physically forms the electric connection with an electric system selected from the group consisting of the first electric system of the first vehicle and the second electric system of the second vehicle. The jumper cable structure 103 comprises a cable 131 and an alligator clip 132.

The cable 131 is an electrically conductive cable 131. The cable 131 is defined elsewhere in this disclosure. The alligator clip 132 is an electrical termination that electrically connects the jumper cable structure 103 to the electric system of a vehicle. The alligator clip 132 is defined elsewhere in this disclosure. The alligator clip 132 comprises a conducting arm 133 and a free arm 134. The conducting arm 133 is the conducting arm 133 of the alligator clip 132. The conducting arm 133 is defined elsewhere in this disclosure. The free arm 134 is the free arm 134 of the alligator clip 132. The free arm 134 is defined elsewhere in this disclosure.

The tubular structure 101 is a mechanical structure. The tubular structure 101 physically attaches to the free arm 134 of the jumper cable structure 103. The cable 131 physically inserts into the tubular structure 101 such that the cable 131, the conducting arm 133, and the free arm 134 form a closed loop structure. The closed loop structure formed by the tubular structure 101 ensures that the free arm 134 of the alligator clip 132 does not inadvertently hook onto a structure while forming an electrical connection with the electric system of a vehicle or pulling cables out of storage. It reduces the change of a cable catching a tailgate cable or a bench leg (e.g.). The tubular structure 101 comprises a rolled spring structure 111 and a cable slot 112.

The rolled spring structure 111 is a mechanical structure. The rolled spring structure 111 forms a flexible tube structure. The rolled spring structure 111 is defined elsewhere in this disclosure. The rolled spring structure 111 forms a scroll that attaches to the free arm 134 of the alligator clip 132 of the jumper cable structure 103. The rolled spring structure 111 further attaches to the cable 131 of the jumper cable structure 103. The rolled spring structure 111 secures the cable 131 to the free arm 134 of the alligator clip 132 such that the cable 131 and the alligator clip 132 forms a loop structure that limits or rejects objects from entering the perimeter bounded by the conducting arm 133, the free arm 134, and the cable 131.

The rolled spring structure 111 forms an insulating structure that wraps around a portion of the free arm 134 of the alligator clip 132. The insulating structure formed by the rolled spring structure 111 further wraps around a portion of the cable 131.

The cable slot 112 is an aperture that is formed through the rolled spring structure 111. The cable slot 112 is sized such that the cable 131 passes through the cable slot 112 into the flexible tube structure of the rolled spring structure 111. The cable slot 112 passes through the flexible tube structure of the rolled spring structure 111 such that the cable 131 exits the rolled spring structure 111 through the congruent end of the rolled spring structure 111 that is distal from the free arm 134 of the alligator clip 132.

The sealing structure 102 forms an insulating structure. The sealing structure 102 is formed from an insulating material. The sealing structure 102 encloses any unnecessarily exposed conductive surfaces of the free arm 134 of the alligator clip 132 with an insulating material that prevents the incorporation of the alligator clip 132 into the formation of an undesirable electric current flow path. Also, it mechanically limits the open end from catching on most structures, such as table legs, edge of a milk crate or a tailgate strap/cable. In the first potential embodiment of the disclosure, sealing structure 102 is selected from the group consisting of a heat shrink material 121 and an electrical tape 122.

The heat shrink material 121 is a polymer sheeting. The heat shrink material 121 is formed from an insulating material. The heat shrink material 121 wraps around and encloses the 8 alligator clip 132 and the cable 131 to prevent the 9 incorporation of the invention 100 into the formation of an undesirable electric current flow path. The volume of the heat shrink material 121 shrinks when the heat shrink material 121 is exposed to heat. The shrinkage of the heat shrink material 121 secures the heat shrink material 121 to the cable 131 and the alligator clip 132 of the jumper cable structure 103.

The electrical tape 122 is an adhesive tape The electrical tape 122 is formed from an insulating material. The electrical tape 122 wraps around and encloses the alligator clip 132 and the cable 131 to prevent the incorporation of the invention 100 into the formation of an undesirable electric current flow path. The adhesive coating of the electrical tape 122 secures the electrical tape 122 to the cable 131 and the alligator clip 132 of the jumper cable structure 103.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Adhesive Tape: As used in this disclosure, an adhesive tape refers to a tape with an adhesive coating on at least one face of the tape.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Alligator Clip: As used in this disclosure, an alligator is a spring loaded clip. The alligator clip is formed with a first arm and a second arm that rotate relative to each other. The first arm and the second arm touch each other when the spring of the alligator clip is in its relaxed shape. The first arm and the second arm are formed with a toothed structure that secures the grip alligator clip to an object. The alligator clip is often used to make temporary electrical connections. When the alligator clip is used to make an electric connection, the clip arm selected to attach to the conducting cable is known as the conducting arm and the remaining clip arm is known as the free arm.

Aperture: As used in this disclosure, an aperture is a prism-shaped negative space that is formed completely through a structure or the surface of a hollow structure.

Cable: As used in this disclosure, a cable is a collection of one or more insulated wires covered by a protective casing that is used for transmitting electricity or telecommunication signals.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid.

When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastener that attaches to an object by gripping or clasping the object. A clip is typically spring loaded.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; 8 and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Heat: As used in this disclosure, heat refers to a transfer of energy between a first object and a second object such that the temperatures of the first object and the second object of one or both of the objects changes. In common usage, heat is said to flow from the warmer object to the cooler object. In systems where the combined energies of the first object and the second object remain constant, the equilibrium temperatures of the first object and the second object will be equal.

Heat Shrink: As used in this disclosure, a heat shrink material is a polymer structure that permanently reduces in volume when exposed to heat. A heat shrink tube is a tubular structure formed from a heat shrink material such that the interior volume of the heat shrink tube will decrease when the heat shrink tube is heated.

Insulating Material: As used in this disclosure, an insulating material is a material that inhibits, and ideally prevents, the transfer of heat through the insulating material. Insulating materials may also be used to inhibit or prevent the transfer of sound or the conduction of electricity through the insulating material. Methods to form insulating materials include, but are not limited to: a) the use of materials with low thermal conductivity; b) the use of materials with low electrical conductivity (or high resistivity); and, c) the use of a structural design that places a vacuum within the insulating material within the anticipated transfer path of the heat, sound, or electric current flow.

Insulating Structure (Electricity): As used in this disclosure, an insulating structure is a structure that inhibits, and ideally prevents, the transfer of electricity through the insulating structure. The insulating structure encloses a space that consumes or transmits electric energy. The insulating structure is formed from an insulating material with low electrical conductivity.

Interior: As used in this disclosure, the interior is used as a relational term that implies that an object is contained within the boundary of a structure or a space.

Jumper Cable: As used in this disclosure, a jumper cable is an electrical connection used to form an electrical 8 connection a first electric system of a first vehicle to a second electric system of a second vehicle. The jumper battery comprises a first cable, a second cable, a first alligator clip, a second alligator clip, a third alligator clip, and a fourth alligator clip. The first alligator clip electrically connects the first cable to the first electric system of the first vehicle. The second alligator clip electrically connects the second cable to the second electric system of the second first vehicle. The third alligator clip electrically connects the first cable to the first electric system of the first vehicle. The fourth alligator clip electrically connects the second cable to the second electric system of the second third vehicle.

Negative Space: As used in this disclosure, negative space is a method of defining an object through the use of open or empty space as the definition of the object itself, or, through the use of open or empty space to describe the boundaries of an object.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines 7 will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered 12 identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two 17 points.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or 12 torsional forces are being applied to the structure.

Roll: As used in this disclosure, a roll is a method of storing paper or other sheeting as a cylindrical structure such that creases are not formed within the paper or sheeting. To form the roll, the paper or other sheeting material is curved over itself around a center axis such that a spiral is formed when the roll is viewed from the end of the cylindrical 19 structure.

Rolled Spring: As used in this disclosure, a rolled spring is a tubular structure that is formed from a sheeting that is formed with a non-Euclidean plane structure. The rolled spring forms a spring. The non-Euclidean plane structure causes the sheeting structure to roll onto itself to form a tube when the rolled spring is in its relaxed shape. The rolled spring can be unrolled such that the rolled spring can be wrapped around the lateral face of a prism shaped such that the congruent end of the prism shaped object does not need to be inserted through the tubular structure of the rolled spring.

Scroll: As used in this disclosure, a scroll is a sheeting that is stored as a roll.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Slot: As used in this disclosure, a slot is a prism-shaped negative space formed as a groove or aperture that is formed in or through an object.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Tape: As used in this disclosure, tape refers to a flexible and narrow strip of textile or sheeting that fastens, secures, or strengthens an object.

Torsion Spring: As used in this disclosure, a torsion spring is a mechanical device that stores mechanical energy through an opposing torque when the mechanical device is bent or twisted. The torsion spring will return to its original relaxed 7 shape when the twisting force is removed.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vehicle: As used in this disclosure, a vehicle is a motorized device that is used for transporting passengers, goods, or equipment. The term motorized vehicle refers to a 19 vehicle can move under power provided by an electric motor or an internal combustion engine. A motorized vehicle further comprises an electrical system that can be used as a source of electric energy. The enclosed passenger space of a vehicle is known as a cab.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An anti-snag jumper cable handle cover comprising a tubular structure, a sealing structure, and a jumper cable structure;

wherein the tubular structure attaches to the jumper cable structure;

wherein the sealing structure encloses the tubular structure and the jumper cable structure;

wherein the jumper cable structure comprises a cable and an alligator clip;

wherein the jumper cable is an electrically conductive cable;

wherein the alligator clip is an electrical termination that electrically connects the jumper cable structure to the electric system;

wherein the alligator clip comprises a conducting arm and a free arm;

wherein the conducting arm is the conducting arm of the alligator clip;

wherein the free arm is the free arm of the alligator clip;

wherein the tubular structure comprises a rolled spring structure and a cable slot;

wherein the cable slot is an aperture that is formed through the rolled spring structure.

2. The anti-snag jumper cable handle cover according to claim 1 wherein the anti-snag jumper cable handle cover is a mechanical structure;

wherein the tubular structure attaches to the jumper cable structure such that the jumper cable structure does not snag during the process of electrically connecting the jumper cable or with another object;

wherein the sealing structure forms an insulating structure that encloses the tubular structure and the jumper cable structure such that the sealing structure prevents the incorporation of tubular structure and the jumper cable structure into undesirable electric current flow paths.

3. The anti-snag jumper cable handle cover according to claim 2 wherein the jumper cable structure is an electrically conductive structure;

wherein the jumper cable structure transfers electric energy;

wherein the jumper cable structure physically forms an electric connection between a first electric system and a second electric system.

4. The anti-snag jumper cable handle cover according to claim 3 wherein the tubular structure is a mechanical structure;

wherein the tubular structure physically attaches to the free arm of the jumper cable structure;

wherein the cable inserts into the tubular structure.

5. The anti-snag jumper cable handle cover according to claim 4 wherein the cable physically inserts into the tubular structure such that the cable, the conducting arm, and the free arm form a closed loop structure;

wherein the closed loop structure formed by the tubular structure ensures that the free arm of the alligator clip does not inadvertently hook onto a structure while forming an electrical connection.

6. The anti-snag jumper cable handle cover according to claim 5 wherein the rolled spring structure is a mechanical structure;

wherein the rolled spring structure forms a flexible tube structure;

wherein the rolled spring structure forms a scroll that attaches to the free arm of the alligator clip of the jumper cable structure;

wherein the rolled spring structure further attaches to the cable of the jumper cable structure;

wherein the rolled spring structure secures the cable to the free arm of the alligator clip such that the cable and the alligator clip forms a loop structure that objects from entering the perimeter bounded by the conducting arm, the free arm, and the cable.

7. The anti-snag jumper cable handle cover according to claim 6 wherein the rolled spring structure forms an insulating structure that wraps around a portion of the free arm of the alligator clip;

wherein the insulating structure formed by the rolled spring structure further wraps around a portion of the cable.

8. The anti-snag jumper cable handle cover according to claim 7 wherein the cable slot is sized such that the cable passes through the cable slot into the flexible tube structure of the rolled spring structure.

9. The anti-snag jumper cable handle cover according to claim 8 wherein the cable slot passes through the flexible tube structure of the rolled spring structure such that the cable exits the rolled spring structure through the congruent end of the rolled spring structure that is distal from the free arm of the alligator clip.

10. The anti-snag jumper cable handle cover according to claim 9 wherein the sealing structure forms an insulating structure;

wherein the sealing structure is formed from an insulating material;

wherein the sealing structure encloses any unnecessarily exposed conductive surfaces of the free arm of the alligator clip with an insulating material that prevents the incorporation of the alligator clip into the formation of an undesirable electric current flow path.

11. The anti-snag jumper cable handle cover according to claim 10 wherein the sealing structure is selected from the group consisting of a heat shrink material and an electrical tape;

wherein the heat shrink material is a polymer sheeting;

wherein the heat shrink material is formed from an insulating material;

wherein the heat shrink material wraps around and encloses the alligator clip and the cable to prevent the incorporation of the anti-snag jumper cable handle cover into the formation of an undesirable electric current flow path;

wherein the volume of the heat shrink material shrinks when the heat shrink material is exposed to heat;

wherein the shrinkage of the heat shrink material secures the heat shrink material to the cable and the alligator clip of the jumper cable structure;

wherein the electrical tape is an adhesive tape the electrical tape is formed form an insulating material;

wherein the electrical tape wraps around and encloses the alligator clip and the cable to prevent the incorporation of the anti-snag jumper cable handle cover into the formation of an undesirable electric current flow path;

wherein the adhesive coating of the electrical tape secures the electrical tape to the cable and the alligator clip of the jumper cable structure.

* * * * *